US012523427B2

(12) United States Patent
Vankampen et al.

(10) Patent No.: US 12,523,427 B2
(45) Date of Patent: Jan. 13, 2026

(54) SYSTEM AND METHOD FOR MONITORING AND CONTROLLING FURNACES

(71) Applicant: L'Air Liquide, Société Anonyme pour l'Etude et l'Exploitation des Procédés Georges Claude, Paris (FR)

(72) Inventors: Peter Vankampen, Shanghai (CN); Dmitriy Chalenko, Kyiv (UA); Manoj Gangadharan, New Delhi (IN); Maxim Misyura, Moscow (RU); Laurent Kepinski, Cracow (PL)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 376 days.

(21) Appl. No.: 18/025,692

(22) PCT Filed: Sep. 2, 2021

(86) PCT No.: PCT/EP2021/074268

§ 371 (c)(1),
(2) Date: Mar. 10, 2023

(87) PCT Pub. No.: WO2022/053390

PCT Pub. Date: Mar. 17, 2022

(65) Prior Publication Data

US 2023/0358475 A1 Nov. 9, 2023

(30) Foreign Application Priority Data

Sep. 10, 2020 (EP) .................................... 20195517

(51) Int. Cl.
*F27D 21/02* (2006.01)
*F27D 21/00* (2006.01)
*F27D 19/00* (2006.01)

(52) U.S. Cl.
CPC ......... *F27D 21/02* (2013.01); *F27D 21/0014* (2013.01); *F27D 2019/0025* (2013.01);
(Continued)

(58) Field of Classification Search
CPC ...... F27B 1/28; F27B 3/28; F27B 5/18; F27B 7/42; F27B 9/40; F27B 13/14;
(Continued)

(56) References Cited

U.S. PATENT DOCUMENTS 9,127,891 B2 * 9/2015 Au ........................ G06T 7/0004
9,488,601 B2 * 11/2016 Ruege ................. F27D 21/0021
(Continued)

FOREIGN PATENT DOCUMENTS

CN 108998608 A * 12/2018 ............... C21B 7/24
CN 210267369 U * 4/2020 ................ F24C 7/02
(Continued)

OTHER PUBLICATIONS

International Search Report and Written Opinion for corresponding PCT/EP2021/074268, Oct. 29, 2021.

*Primary Examiner* — Gregory A Wilson
(74) *Attorney, Agent, or Firm* — Elwood L. Haynes

(57) ABSTRACT

A furnace monitoring system for monitoring a furnace over a span of time during furnace operation, including a thermal imaging apparatus, the apparatus is disposed outside of the furnace and at a distance from the exterior of the furnace to generate field signals of the furnace; a signal processing unit configured and programmed for receiving the field signals and generating a temperature map of the exterior of the furnace; and a means for displaying the temperature map locally or remotely. Wherein in that the furnace monitoring system is a system for monitoring the furnace over a span of time during furnace operation and in that the generated temperature map is divided into several zones, which cor-
(Continued)

respond to different components of the furnace selected from burner, viewing port for burner observation, charging port, discharging port and flue gas channel.

8 Claims, 2 Drawing Sheets

(52) U.S. Cl.
CPC ................ *F27D 2019/0028* (2013.01); *F27D 2021/0057* (2013.01); *F27D 2021/026* (2013.01)

(58) Field of Classification Search
CPC .......... F27B 14/20; F27B 15/20; F27D 21/04; F27D 2021/023; F27D 2021/026
See application file for complete search history.

(56) References Cited

U.S. PATENT DOCUMENTS

| | | | | |
|---|---|---|---|---|
| 10,054,367 | B2 * | 8/2018 | Bayram | F27D 21/0021 |
| 12,241,685 | B2 * | 3/2025 | Chan | F27D 21/02 |
| 2012/0052450 | A1 * | 3/2012 | Lou | F23L 7/007 431/75 |
| 2013/0120738 | A1 | 5/2013 | Bonin et al. | |
| 2014/0123758 | A1 | 5/2014 | Gebski et al. | |
| 2017/0131033 | A1 | 5/2017 | Bayram et al. | |
| 2017/0261264 | A1 | 9/2017 | Wang et al. | |

FOREIGN PATENT DOCUMENTS

| | | | | |
|---|---|---|---|---|
| CS | 274898 | B2 * | 12/1991 | |
| KR | 101666095 | B1 * | 10/2016 | |
| WO | WO-03069230 | A1 * | 8/2003 | F23N 5/082 |

* cited by examiner

SYSTEM AND METHOD FOR MONITORING AND CONTROLLING FURNACES

CROSS REFERENCE TO RELATED APPLICATIONS

This application is a 371 of International Application No. PCT/EP2021/074268, filed Sep. 2, 2021, which claims priority to European Patent Application No. 20195517.6, filed Sep. 10, 2020, the entire contents of which are incorporated herein by reference.

FIELD OF THE INVENTION

The present invention relates to furnace operation monitoring or controlling method and system. More particularly, it relates to furnace operation monitoring or controlling with thermal imaging technology.

BACKGROUND

A wide variety of industries, such as steel, aluminum and glass, all relies on furnaces for manufacturing processes.

It is known in the art to monitor the physical integrity of the furnace, in particular of the refractory materials of the furnace structure.

US-A-2013/120738 relates to metallic vessels or containers lined with refractory material and designed to hold materials at elevated temperatures as used in industrial applications, such as gasification processes in chemical and power production, Electric-Arc Furnaces (EAF), Basic Oxygen Furnaces (BOF), ladles, blast furnaces, degassers, and Argon-Oxygen-Decarburization (AOD) furnaces in steel manufacturing. From US-A-2013/120738 it is known to monitor the integrity of such a container protected by a refractory material by means of a first radiation detector configured to measure an external surface temperature of the container and a first radiation source configured to measure a thickness of the refractory material, and whereby a central controller displays to the user the measurement of the external surface temperature of the container and the measurement of the thickness of the refractory material.

US-A-2017/131033 discloses a system to evaluate and monitor the status of a material forming part of an asset, such as a refractory furnace. The system is operative to identify flaws and measure the erosion profile and thickness of different materials, including refractory materials of an industrial furnace, using radiofrequency signals. The system comprises a software management subsystem configured to implement signal processing techniques to process the data collected and generate reports to visualize the status, estimate the remaining operational life, and determine the level of penetration of molten material into the surrounding layers of the furnace and enables a user to monitor the status of the furnace both locally and remotely.

US-A-2014/123758 discloses a system and method for the acoustic monitoring the structural integrity and physical deformation of a metallurgical furnace, including during furnace operation. Acoustic sensors (and optionally other sensors) are mounted to the furnace. Acoustic emission events generated in the furnace are analyzed to identify conditions that exceed one or more thresholds. The location of acoustic emissions may be identified and reported. Output signals may be generated in response to acoustic emissions. The location of acoustic emissions may be used to identify the location of potential failures in the furnace.

The purpose of the above methods and systems is thus to monitor the structural integrity of furnaces.

Furnaces are prone to inefficiency or failures caused by many reasons. Examples include coking that covers the interior of the furnace, under- and overheating, burner misalignment and product leakage. Process conditions also impact the performance of the furnaces significantly. If these failures or suboptimal conditions were not corrected, they would result in quality issues, waste of energy, even shutdown of an entire process line.

For this reason, it is also known to monitor the operation of a furnace.

In US-A-2017/261264, a fault diagnosis method for an electrical fused magnesia furnace is disclosed, which includes the steps of: 1) arranging six cameras; 2) obtaining video information by the six cameras during furnace operation and sending the video information to a control center; then analyzing the video information by a chip of the control center. The chip uses a multi-view-based fault diagnosis method. Said method comprises steps of: 2-1) comparing a difference between two consecutive frame histograms for shots segmentation; 2-2) computing a set of characteristic values for each shot obtained by the step 2-1), and then computing color, texture, and motion vector information. Shot importance is evaluated via entropy. 2-3) Shots are clustered together by calculating similarity. 2-4) a multi-view video summarization is generated and optimized with a multi-objective optimization model and 2-5) fault detection and diagnosis is provided. 3) results of the fault detection and diagnosis are displayed on a host computer interface of the control center.

Other methods for monitoring the operation of furnaces consist of temperature sensing and infrared imaging. The sensors or IR cameras are placed either inside the furnace or close to a viewing port, and they measure a single point or a very limited area inside the furnace. As a result, operators cannot obtain an overview and form a direct correlation between process steps and furnace performance.

US-A-2017/261264 discloses a fault diagnosis device based on common information and special information of running video information for an EFMF (electrical fused magnesium furnace) Using six cameras. Three cameras are arranged at relative positions of three electrodes above a surface layer of the EFMF and aim at the electrodes of the EFMF, so as to monitor a furnace eruption fault. The other cameras are symmetrically arranged around a furnace body by a 120-degree difference and aim at the furnace body, so as to monitor occurrence of a furnace leaking fault. In a control center connected to the six cameras, video information obtained by the six cameras is collected and analyzed. Analyzed data are displayed on a host computer interface of the control center. The six cameras are thus applied to monitor a furnace surface and a furnace body according to a multi-view idea, so as to detect, diagnose and identify furnace eruption fault and furnace leaking fault well through the common information and the special information extracted. Temperature detection and thermal imaging are not mentioned.

SUMMARY OF THE INVENTION

The invention aims to provide a system and a method, which allows for a holistic data collection and monitoring of the entire furnace over a period of time, based on thermal imaging technologies, especially infrared (IR) cameras. Suitable control algorithms can be applied to treat collected data to produce control signals, which are then fed to a furnace controller to optimize the performance of the furnace. Improved furnace control offers the potential for significant energy savings and emissions reductions, especially $NO_x$. The entire system is designed to be rugged, easy to install, and relatively transparent to the furnace operator.

In one aspect, the present invention discloses a furnace monitoring system comprising a thermal imaging apparatus, said apparatus is disposed at a distance from the exterior of the furnace to generate field signals of the furnace. The monitoring system also comprises a signal processing unit configured and programmed for receiving said field signals and for generating a temperature map of the exterior of the furnace and a Human Machine Interface (HMI) for displaying the temperature map locally or remotely.

In another aspect, the thermal imaging apparatus comprises a CCD (Charge-Coupled Device) camera.

According to the invention, the temperature map is divided into several zones, which correspond to different components of the furnace. These different components are selected from the group comprising one or more burners, charging port, discharging port, flue gas channel or combinations of at least two of said components.

In another aspect, the present invention discloses a furnace controlling system comprising a thermal imaging apparatus, said thermal imaging apparatus being disposed at a distance from the exterior of the furnace to generate field signals of the furnace. The furnace controlling system also comprises a signal processing unit configured and programmed for receiving said field signals and for generating a temperature map of the exterior of the furnace, HMI for displaying the temperature map locally or remotely, an analyzing unit configured and programmed for producing control signals based on the received field signals or the generated temperature map and a furnace controller configured for receiving said control signals and applying them to control the furnace.

In another aspect, the present invention discloses a method for controlling the operation of a furnace using the above-described furnace controlling system. The method comprises the following steps:

- producing field signals of the exterior of a furnace over a span of time with the thermal imaging apparatus;
- transmitting the field signals to the signal processing unit and generating a temperature map of the exterior of the furnace over the span of time with the signal processing unit;
- displaying said temperature map locally or remotely by means of the HMI;
- applying a control algorithm to the received field signals or the generated temperature map and producing control signals by means of the analyzing unit; and
- controlling the operation of the furnace by the furnace controller using the produced control signals.

For the afore-mentioned method, the span of time covers multiple operational steps of the monitored furnace. Examples of such possible operational steps include: charging the furnace via the charging port, discharging the furnace via the discharging port, heating a charge without phase change of the charge, causing a solid charge to melt by heat supplied thereto, refining a melt in the furnace, etc.

In the current invention, the thermal imaging apparatus, in particular an IR camera, is placed outside of and at a distance from the furnace. The invention thus eliminates the need for expensive heat-resistant materials or cooling accessories for the imaging apparatus. Disposed at a proper location, the thermal imaging apparatus and corresponding signal processing unit produce a thermal profile or temperature map of the furnace over a period of time. The thermal profile or temperature map is divided into different zones, with a focus on selected components of the furnace. This improves imaging sensitivity.

Since the field signals and the temperature map are generated over a span of time during continuous operation of the furnace, heat leaks, overheating spots or other abnormalities associated with specific parts or operational steps are readily visible to operators either locally or remotely. For example, the field signals and temperature-map zones corresponding to respectively the loading or charging port and the discharging point reveal the sequence and frequency of loading and discharging, as well as the duration of each said process steps. Such information can help the operators not only to monitor the physical condition of the furnace and its components to prevent catastrophic failures, but can further help the operators to optimize furnace operation and thereby also the process(es) taking place in the furnace.

In addition, information derived from the field signals and/or temperature map can be input into the analyzing unit to generate control signals, which are fed to the furnace controller for controlling the furnace.

The control algorithm applied by the analyzing unit may be or may have been developed through mathematical calculation or simulation of historical (i.e. previously collected) operational data.

In summary, the present invention provides an economical and near real-time method for monitoring, optimizing and controlling the operation of a furnace, Consequentially, preventive maintenance can also be performed when needed and costly unexpected failures or shutdowns can be avoided.

BRIEF DESCRIPTION OF THE DRAWINGS

The accompanying drawings are to be understood as examples of the present invention, and do not in any way limit the scope thereof.

In FIG. 1, the reference numbers indicate the following features: 1—furnace, 2—CCD camera, 3—signal processing unit, 4—analyzing unit, 5—furnace controller, 6—burner, 7—loading port, 8—discharging port, 9—flue gas channel.

DETAILED DESCRIPTION OF THE PREFERRED EMBODIMENTS

Figure 1:
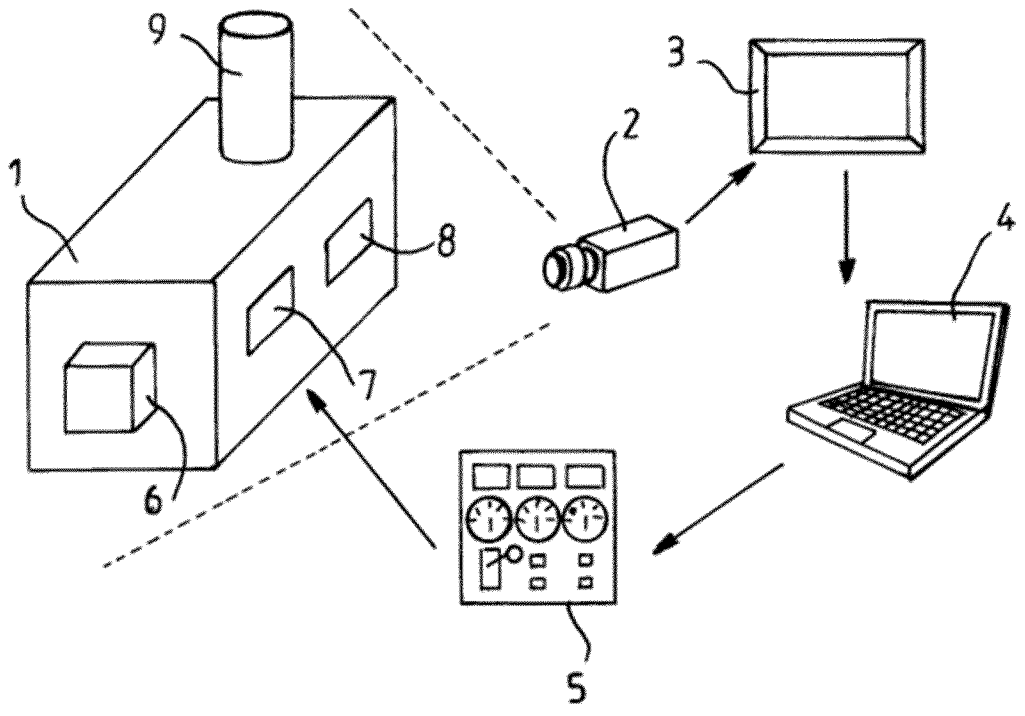
FIG. 1 is a schematic representation showing components of a furnace monitoring and controlling system.

In the illustrated embodiment, a thermal imaging apparatus using multiple infrared wavelengths is employed to obtain fast and accurate temperature mapping of the full field of the furnace during furnace operation. For example, the thermal imaging apparatus comprises a CCD camera, which sends field signals to a beam splitter. One beam was to be used to optically focus the camera; the other beam was to be sent to a signal processing unit, such as a computer containing data processing software.

In the present context, "Field signals" refer to the mapping of a parameter over a 2-D or 3-D area or zone of interest, in contrast to punctual or "spot" signals measuring a parameter at an individual point only.

The CCD camera is disposed at a location capable of capturing signals from all areas of interest, including the burner, all viewing, loading and discharging ports, as well as flue gas channels. The collected IR field signals are digitally processed into artificial-color temperature maps (whereby different colors indicate different temperatures), which can be stored or displayed on a monitor. Monitors or other displaying means may be located in vicinity to the furnace or away from the furnace in a remote area.

The measuring field of the CCD camera is divided into different zones corresponding to selected components of the furnace, such as the loading port, the discharging port, burner, viewing ports for observing the burner and the flue gas channel. According to an embodiment of the invention, only field signals from zones corresponding to such selected components are collected and processed by the signal processing unit. In this way, data sensitivity and data processing speed can be increased and the resulting temperature maps are dearer for operators.

Operators, who view the temperature map of the furnace at either a local or a remote location, can compare the measured temperature(s) with set temperature(s) of the furnace, corresponding to a standard or desired furnace operation, and adjust operational parameters according to his/her experiences or set protocols. Accurate temperature measurements are, for example, obtained by comparing the pixel intensities at two distinct IR wavelengths. Near IR wavelengths of 700-800 nm may be used.

In addition to or instead of manual control by the operator (s), the digitally processed field signals or the temperature map are sent to the analyzing unit. In the analyzing unit, software based on incorporated control algorithms can be run either locally or remotely, for example on a cloud-based server, to produce control signals capable of performing various functions. The control algorithms may, in particular, produce control signals in order to minimize differences between field temperature set points and measured field temperatures. The software allows storage of data and review of historical information. The control signals are transmitted to the furnace controller for controlling the furnace either in a closed loop or open loop fashion both to keep operation parameters within safe or in-control limits and to automatically tune them to pre-set values or to quickly respond to warning signs. For doing so, the analyzing unit may compare the actual data values to alarm or alert threshold values to determine whether alerts are desirable or required, and may also analyze combinations of sensor data against a theoretical and/or experimental database to determine whether maintenance intervention is required or another condition exists that requires attention. Such analysis and alarm determination may be performed by a cloud computing system. The alerting can be done via any standard method, including through the use of lights or audible alarms in the control room, at the burner, at the flow control skid, or at any other convenient location. The furnace controller can be a primary or an auxiliary controller, which is configured to receive the control signals to assist with furnace control.

With the above-described furnace monitoring and controlling system, field temperature data of furnace exteriors and loads are generated in essentially real time and can be obtained or stored over a period of time covering various process steps. A mathematical model or simulation is constructed based on historical data for more optimal operation conditions. Through comparison with the optimized database, field control is performed. Field control works in conjunction with traditional controllers to provide adjustments to mitigate hot spots and instabilities and to optimize combustion performance. Field control consists not of matching set points of a limited number of measurements, but of minimizing the difference between a set of field set points and actual field measurements.

The field signals and generated temperature map not only make it possible to monitor the safe operation of the furnace and to determine whether maintenance intervention is required. The field signals and/or generated temperature map may also be used to optimize the furnace operation.

For example, the control algorithms may determine needed adjustments to air/fuel ratio, to the firing rate for all or some of the burners, to the sequence and frequency of loading and discharging, as well as to the time intervals for each process step.

For example, field signals corresponding to a burner or to a viewing port for a burner make it possible to verify in near real-time the proper operation of the burner concerned and to identify any malfunction (such as flame extinction or flame deviation) or scope for optimization (such as an increased or decreased firing rate in order to obtain a desired temperature profile in the furnace) on the basis of the field signal corresponding to the burner or the viewing port or the corresponding zone of the generated temperature map.

Field signals corresponding to a charging port make it possible to observe in near real-time, on the basis of the field signal corresponding to charging port or the corresponding zone of the generated temperature map, whether the charging port is open or closed, whether the open port is fully open or the closed port is completely closed and the time during which the charging port is open. Due to the effect thereof the on the thermal image of the furnace, it may even be possible to observe, via said field signals or the generated temperature map, whether material (charge) is being fed to the furnace via the charging port and whether the charging port remains open significantly longer than required for feeding the charge.

Similarly, field signals corresponding to a discharging port make it possible to observe in near real-time whether the discharging port is open or closed, whether closure is complete and how long the discharging port remains open. It may even be possible to observe whether material is effectively being discharged via the discharging port, including whether there is a time lapse between the opening of the discharging port and the start of material being discharged and/or whether there is a time lapse between when discharging is terminated and the closure of the discharging port.

The time during which a furnace port, in particular a charging or discharging port, remains open during a production cycle is an important factor with respect to furnace performance. Indeed, open ports can cause significant heat losses and the ingress of important amounts of unheated nitrogen-containing ambient air. Keeping the duration during which ports are open to a minimum can thus significantly improve furnace efficiency.

Field signals corresponding to the flue gas channel and the corresponding zone of the generated temperature map provide an indication in near real-time of the level of heat losses via the flue gas channel. In addition, when the flue gas channel includes a post-combustion zone in which combustible substances present in the flue gas are combusted with oxidant, the field signals corresponding to the post-combustion zone in the flue gas channel and the corresponding zone of the temperature map may provide in near real-time an indication of (changes in) the levels of combustible substances in the flue gas evacuated from the furnace.

The field signals generated by the thermal imaging apparatus and the temperature map generated by signal processing unit thus provide in near real-time important information regarding the operation of the furnace, any abnormalities and opportunities for improving the efficiency of furnace operation.

Consequentially, objectives such as increased thermal efficiency, lower NOx emissions, elimination of hot spots, and prevention of shutdowns are achieved. In all embodiments, signals are transmitted via wires or a network such as Internet, an intranet, a local area network (LAN), and a wide area network (WAN), with wired and/or wireless communication. The data processing unit may include a local or cloud-based server, where data can be archived and from which data can be retrieved. FIG. 1 illustrates a furnace monitoring and controlling system of the present invention. An exemplary furnace 1 includes a furnace body, a burner 6, a loading or charging port 7, a discharging port 8 and a flue gas channel 9. Whereas, only one burner is shown in the figure, furnaces may comprise multiple burners and all or some of said burners (preferably all) may be monitored using the furnace monitoring or controlling system of the present invention. The loading port 7 is opened for feeding raw materials into the furnace and closed after the feeding is completed. Likewise, the discharging port 8 is opened and closed for unloading product from the furnace. Their open duration, relative sequence and time intervals in between steps have an impact on the energy efficiency of the furnace performance. At least one thermal imaging apparatus, in this case, a CCD camera 2 is placed at a predetermined location outside of the furnace, which enables it to take measurements of the selected components of the furnace. Since the signals are collected over the entire field; and not focused on a few distinctive points, the signals are referred to as field signals. Such field signals are transmitted to a signal processing unit 3 either through hardwires or wireless network. The signal processing unit 3 converts the field signals into a temperature map and the map is displayed either through an integrated display device or sent out to a remote display device (HMI), such as a cellular phone for the operators to view. When more controlling functions are desired, the temperature map or the raw field signals are fed into an analyzing unit 4, which utilizes a control algorithm to produce control signals based on comparison with data for ideal operational condition. The analyzing unit 4 can be a stand-alone computer or is combined with the signal processing unit 3 into one piece of equipment. The control signals are then transmitted to a furnace controller 5 to facilitate its control over the operation of the furnace. Normally, the furnace controller 5 relies on signals from other sensors to practice primary control and the signals originally captured by the thermal imaging apparatus serve as source for auxiliary control.

Figure 2:
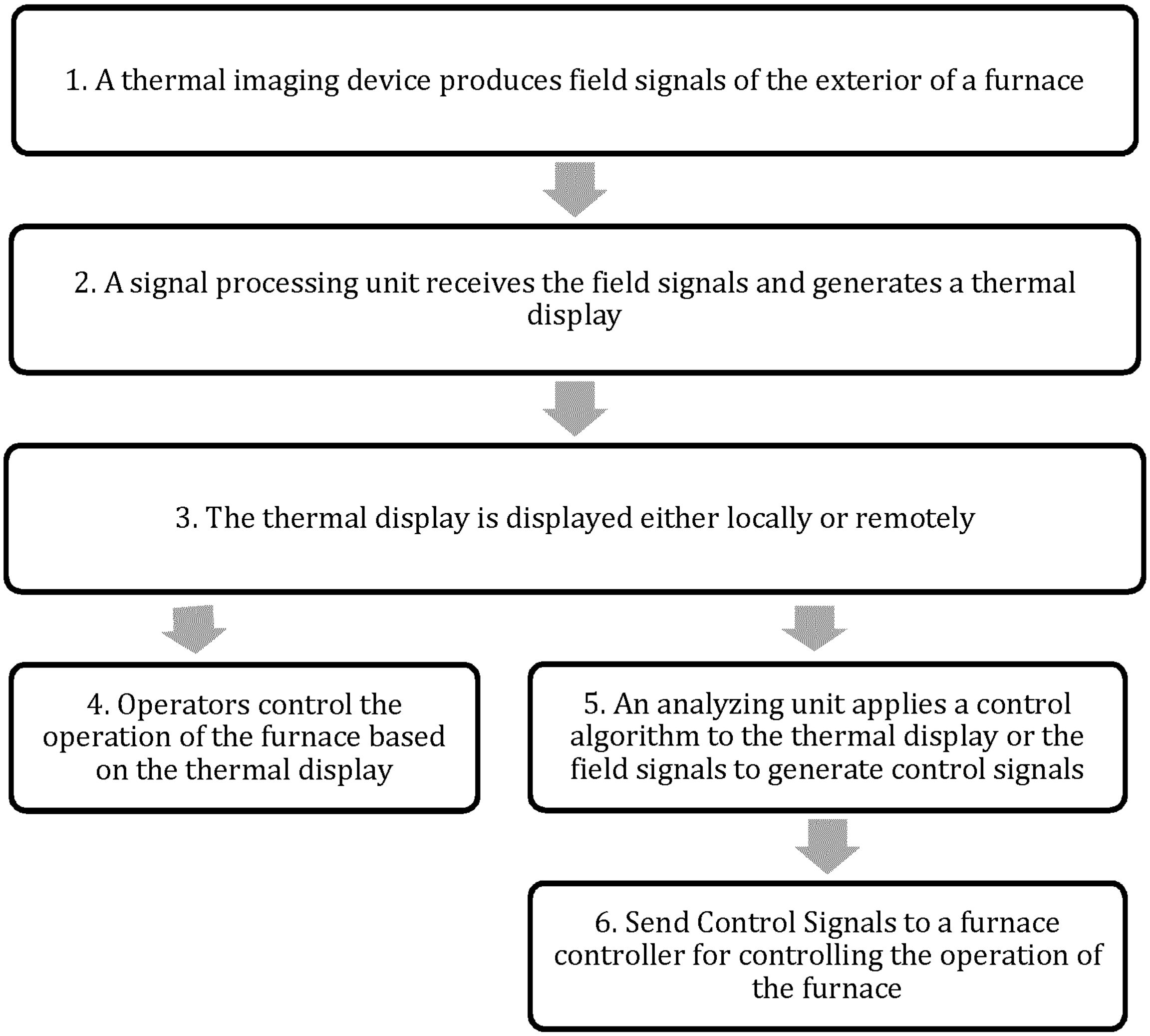
FIG. 2 is a flow chart indicating the steps of the present invention.

The steps for monitoring and controlling the furnace are summarized in the flowchart of FIG. 2.

Although this invention has been described in detail with reference to certain embodiments, those skilled in the art will recognize that variations and modifications of the described embodiments may be used. Accordingly, these variations and modifications are also within the spirit and scope of the invention as defined by the appended claims and their equivalents.

The invention claimed is:

1. A furnace monitoring system for monitoring a furnace over a span of time during furnace operation, the monitoring system comprising:

a) a thermal imaging apparatus, said apparatus is disposed outside of the furnace and at a distance from the exterior of the furnace to generate field signals of the furnace;

b) a signal processing unit configured and programmed for receiving said field signals and generating a temperature map of the exterior of the furnace; and c) a means for displaying the temperature map locally or remotely, wherein:

in that the furnace monitoring system is a system for monitoring the furnace over a span of time during furnace operation and in that the generated temperature map is divided into several zones, which correspond to different components of the furnace selected from burner, viewing port for burner observation, charging port, discharging port and flue gas channel.

2. A furnace controlling system for controlling the operation of the furnace over a span of time, the controlling system comprising a furnace monitoring system according to claim 1, the furnace controlling system further comprising:

d) an analyzing unit configured and programmed for producing control signals based on the received field signals or the generated temperature map; and e) a furnace controller configured for receiving said control signals and applying them to control the furnace.

3. A method for controlling the operation of a furnace over a span of time using the furnace controlling system of claim 2, the method comprising:

a) producing field signals of the exterior of the furnace over the span of time during furnace operation with the thermal imaging apparatus;

b) transmitting the field signals to the signal processing unit and generating the temperature map of the exterior of the furnace, which is divided into several zones, which correspond to different components of the furnace selected from burner, charging port, discharging port and flue gas channel, over the span of time, and displaying the temperature map displayed locally or remotely;

c) applying, with the analyzing unit, a control algorithm to the received field signals or the generated temperature maps to produce control signals;

d) controlling the operation of the furnace with the furnace controller using the produced control signals.

4. The method of claim 3, wherein step a) and b) are performed by a CCD camera.

5. The method of claim 3, wherein only field signals from zones corresponding to selected components of the furnace are treated by the signal processing unit.

6. The method of claim 3, wherein the algorithm is run on a cloud-based server.

7. The method of claim 3, wherein the span of time covers multiple operation steps of the furnace.

8. The method of claim 7, wherein the multiple operation steps include feeding raw materials into the furnace through the charging port and discharging the residues from the discharging port.

* * * * *